No. 785,515. Patented March 21, 1905.

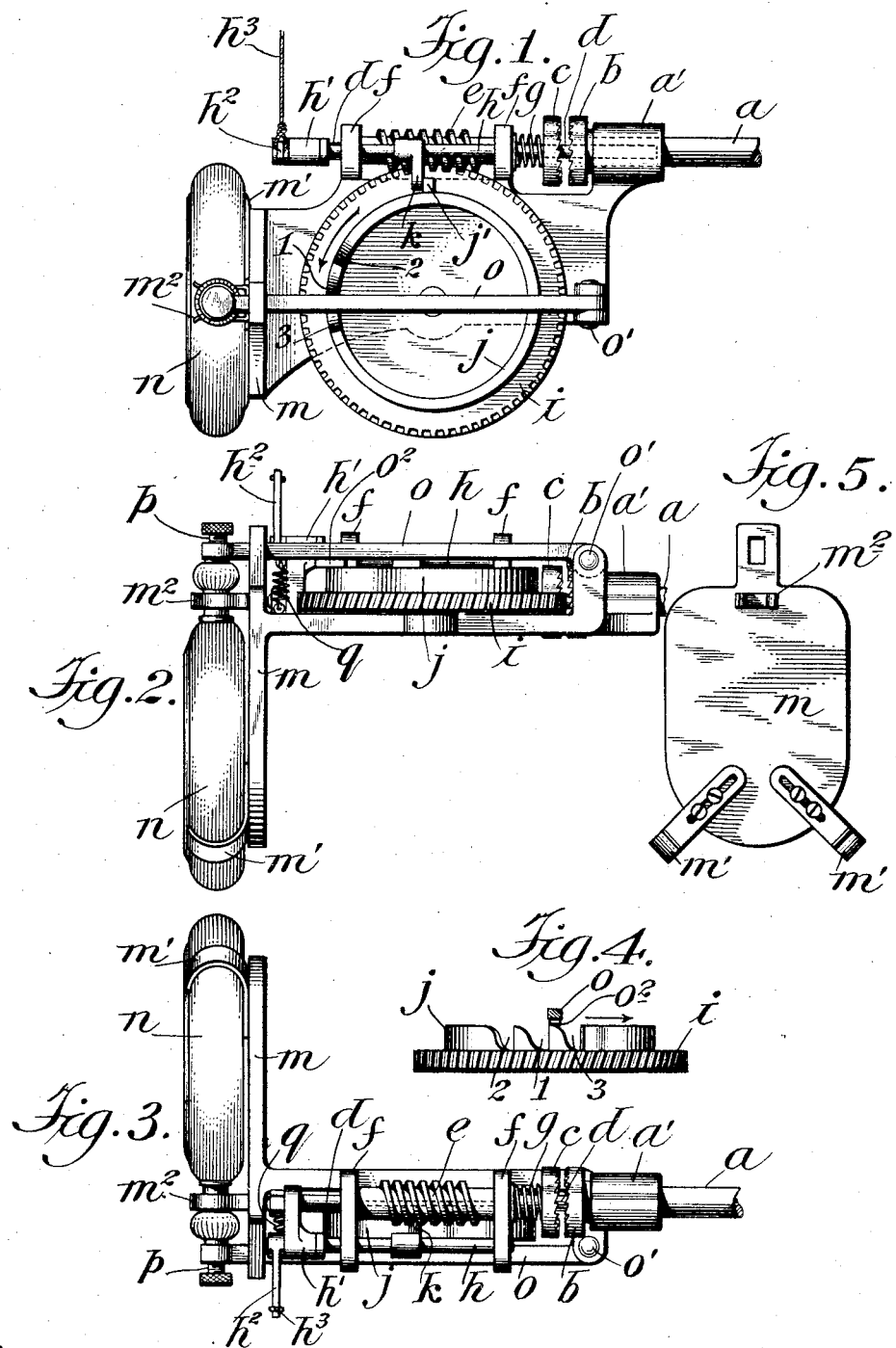

UNITED STATES PATENT OFFICE.

ALDEN L. McMURTRY, OF NEW YORK, N. Y.

SPEED-TIMING ATTACHMENT FOR BICYCLES, &c.

SPECIFICATION forming part of Letters Patent No. 785,515, dated March 21, 1905.

Application filed June 8, 1904. Serial No. 211,686.

*To all whom it may concern:*

Be it known that I, ALDEN L. McMURTRY, a citizen of the United States of America, residing in the borough of Manhattan, city, county, and State of New York, have invented certain new and useful Improvements in Speed-Timing Attachments for Bicycles and other Vehicles, of which the following is a specification.

This invention comprises an apparatus for attachment to a bicycle or other vehicle by which it is driven and serves to indicate the time consumed in traversing a given distance. For instance, in the case of a bicycle policeman desiring to obtain a record of the speed of an automobile for a tenth or an eighth of a mile or for a longer or shorter distance (determined by the adjustment or arrangement of the apparatus) there is provided a means for starting a stop-watch, arresting it when the prescribed distance has been traversed, and ultimately when desired resetting it at zero, all at the will of the rider.

In the accompanying drawings, Figure 1 is a plan view; Fig. 2, a side elevation of one side; Fig. 3, an elevation of the opposite side, the parts being shown inverted; Fig. 4, a detail view showing the notched or cam ring and a coöperating arm that controls the stop-watch, and Fig. 5 an elevation showing the holder for the stop-watch.

$a$ is a shaft driven from a rotating part of the bicycle or other vehicle in any suitable way, so that the shaft will be rotated at appropriate speed, as will hereinafter appear. This shaft has an elongated bearing $a'$ in the frame of the apparatus and carries at its end one member $b$ of a clutch that may be an ordinary toothed clutch, as shown, or of any other appropriate construction. The opposite members $c$ of the clutch is carried upon the end of a shaft $d$, splined in a worm $e$, held between plates or posts $f f$. A spring $g$, enveloping the shaft and interposed between the clutch head or member $c$ and the adjoining plate $f$, tends normally to close the clutch. Parallel with the shaft $d$ and mounted to move endwise in the plates or posts $f$ is a rock-shaft $h$, which also has a bearing in a coupling block or piece $h'$, rigidly connected to the shaft $d$ near the end opposite the clutch. The arrangement is such that the shaft $h$ may rock, while the two shafts are coupled to move endwise together. The worm $e$ gears with the worm-wheel $i$, having upon its face an upwardly-projecting annular flange or ring $j$, from which projects laterally a stop $j''$, that abuts against a corresponding stop $k$ on the endwise-movable shaft $h$. A radially-projecting arm $h^2$ at one end of the rock-shaft $h$ has connected to it a cord $h^3$, extending into convenient reach of the rider of the bicycle or occupant of the vehicle.

When the worm-gear $i$ has been driven into the position shown in Fig. 1, the stop $j''$, acting on the stop $k$, has moved the rock-shaft endwise and separated the members of the clutch. A suitable strain upon the cord $h^3$ rocks the shaft and carries the stop $k$ thereon out of engagement with the stop $j''$, when the reaction of the spring $g$ brings the members of the clutch into engagement. The worm will now be rotated and will drive the worm-gear $i$ through one revolution until the stop $j''$ again acts to separate the members of the clutch.

The front of the frame is formed with a vertically-disposed plate $m$, having on opposite sides near its bottom clips $m' m'$ to receive and hold a stop-watch $n$, the post of which is also embraced and held by spring-jaws $m^2$ near the top of the watch-supporting plate. Extending diametrically across and above the worm-gear $i$ is a horizontal arm $o$, pivoted at its rear end upon a horizontal pivot $o'$ and carrying in its front end a screw-threaded adjustable post $p$, arranged immediately over the setting head or post of the watch. A spring $q$ normally tends to draw the arm $o$ downwardly and cause the adjustable post $p$ to bear upon the setting-head of the watch. This action, however, is normally prevented by a lug $o^2$ on the arm $o$, that bears upon the upper face of the ring $j$. In the ring in close relation to each other are formed three recesses or cam-notches 1 2 3.

When the parts are in the position shown in Fig. 1, with the driving-clutch disengaged, the lug on the pivoted arm $o$ rests upon the ring between the notches 3 and 1. If now a strain be exerted upon the cord, the clutch $c b$ is closed, the worm commences to rotate, and the worm-gear $i$ is revolved in the direction of the arrow, the lug $o^2$ drops into the recess 1, and the adjustable post $p$ is drawn with sufficient violence against the setting-head of the watch, and the watch that has been previously stopped merely is thereby reset to zero. The lug $o^2$ then rides upon the ring between the recesses 1 and 2 and then falls into the recess 2, thereby starting the watch. This condition is maintained until the revolution of the ring $j$ brings the notch 3 under the worm $o$, when the latter will again be drawn down by its spring and the watch stopped. Then as the arm $o$ rides up on the ring at the rear of the notch 3 the stops $j''$ $k$ come into engagement, the clutch is opened, and motion of the parts ceases. The watch will now show the period of time during which the notch 2 has traveled from under the pivoted arm $o$ and the notch 3 brought under that arm when, as stated, the watch is stopped. The relation of the pitch of the worm and worm-gear $i$ and speed rotation of the shaft $a$ may readily be made such that the time consumed in this traverse of the ring under the arm $o$ will represent a fixed distance traversed by the vehicle—for instance, a tenth or an eighth of a mile—while the watch preserves a record of the time consumed in traversing that distance.

I claim as my invention—

1. In a timing attachment for vehicles, the combination of a part adapted to be driven relatively to the speed of the vehicle, a part actuated thereby at the will of the rider, means controlled by the second-named part acting to automatically start a stop-watch and automatically stop it after the vehicle has traveled a determined distance, and means automatically acting to throw the second-named part out of operation when the watch has been stopped.

2. In a timing attachment for vehicles, the combination of a part adapted to be driven relatively to the speed of the vehicle, a part actuated thereby at will of the rider, means controlled by the second-named part acting to automatically reset and start a stop-watch and automatically stop it after the vehicle has traveled a determined distance, and means automatically acting to throw the second-named part out of operation when the watch has been stopped.

3. A timing attachment for vehicles, comprising the combination of a shaft adapted to be rotated relatively to the speed of the vehicle, a member of a normally open clutch carried thereby, a part carrying the second member of the clutch, a rotatable member geared to said part, a spring normally tending to close the clutch, means acting to hold the clutch open when the rotatable member has been driven into normal position, a device under the control of the driver by which said means may be thrown out of action to permit the closing of the clutch, and means controlled by the rotatable member during its return to normal position acting to start a stop-watch and stop it after the vehicle has traversed a determined distance.

4. A timing attachment for vehicles, comprising the combination of a shaft adapted to be rotated relatively to the speed of the vehicle, a member of a normally open clutch carried thereby, a part carrying the second member of the clutch, a rotatable member geared to said part, a spring normally tending to close the clutch, means acting to hold the clutch open when the rotatable member has been driven into normal position, a device under the control of the driver by which said means may be thrown out of action to permit the closing of the clutch, and means controlled by the rotatable member during its return to normal position acting to reset and start a stop-watch and stop it after the vehicle has traversed a determined distance.

In testimony whereof I have hereunto subscribed my name.

ALDEN L. McMURTRY.

Witnesses:
KATHARINE MACMAHON,
LILLIE F. BROWNING.